June 26, 1973 R. H. LUEBBE, JR., ET AL 3,741,762

MANIFOLD IMAGING MEMBER AND PROCESS

Filed Jan. 11, 1971

INVENTORS
RAY H. LUEBBE JR.
THOMAS GREENO
JOHN F. BYRNE

BY Raymond L. Loyer

ATTORNEY 3,741,762

MANIFOLD IMAGING MEMBER AND PROCESS

Ray H. Luebbe, Jr., Rochester, N.Y., and John F. Byrne, Worthington, and Thomas M. Greeno, Columbus, Ohio, assignors to Xerox Corporation, Stamford, Conn.

Filed Jan. 11, 1971, Ser. No. 105,387
Int. Cl. G03g *5/00, 13/00*
U.S. Cl. 96—1.5 38 Claims

ABSTRACT OF THE DISCLOSURE

An imaging method which employs an imaging member comprising a donor layer having coated thereon a first resinous layer, a fracturable electrically photosensitive imaging layer, a second resinous layer on said electrically photosensitive layer and a receiver layer on said second layer. The method involves subjecting the imaging layer to an electric field, exposing the imaging layer to an imagewise pattern of electromagnetic radiation to which the imaging layer is sensitive and, while the resinous layers are thermally liquefied, the donor and receiver layers are separated whereupon the imaging layer fractures leaving a positive image on one of the donor and receiver layers and a negative image on the other layer.

BACKGROUND OF THE INVENTION

The present invention relates in general to imaging and more specifically to a process for the formation of images by layer transfer in image configuration and an improved imaging member.

Although color imaging techniques based on the transfer of an imaging layer have been known in the past, techniques have always been difficult to operate because they depend on photoreactions and generally involve the use of distinct layered materials for the two functions of imagewise transfer and image coloration. A typical example of the complex structures and sensitive materials employed in prior art techniques is described in U.S. Pat. 3,091,529 to Buskes. Other layer transfer techniques involve the use of a single layer to provide the imagewise transfer and image coloration; but, in order to provide an imaging member which is sufficiently sound structurally to permit handling, shipping and storage, it is necessary to render the imaging layer fracturable during the imaging process. Generally, the means previously provided to render the imaging layer fracturable involves the use of liquid solvents which either swelled, partially dissolved or otherwise weakened the imaging layer to the extent necessary to permit fracture under the influence of an electric field and activating electromagnetic radiation. Such liquids acted as swelling agents, solvents or partial solvents for the imaging layer. The use of liquids in an imaging process necessitated cumbersome equipment not only for the storage and handling of the liquid during the imaging process. Generally, the means previously provided to residual solvent on the image subsequent to image formation.

SUMMARY OF THE INVENTION

It is, therefore, an object of this invention to provide an imaging process which overcomes the above noted disadvantages.

Another object of this invention is to provide a layered transfer imaging process which has relatively high sensitivity and relatively good coloration.

Another object of this invention is to provide an imaging member for use in a layer transfer imaging process.

Another object of this invention is to provide a layer transfer imaging process free of the use of volatile liquids.

These and other objects are attained in accordance with this invention wherein there is provided an imaging member comprising a donor substrate having coated thereon a first resinous, thermally liquefiable layer, an electrically photosensitive imaging layer which is structurally fracturable in response to the combined effects of an electric field and exposure to electromagnetic radiation to which it is sensitive, a second resinous thermally liquefiable layer on the electrically photosensitive layer and a receiver layer on the second resinous layer. Such a structure is referred to herein as a manifold set.

In accordance with the process of this invention, the imaging layer of the manifold set is subjected to an electric field and exposed to electromagnetic radiation to which it is sensitive. While sandwiched between the donor and receiver layers, the exposed imaging layer is bounded on either side by resinous layers which are thermally liquefied. When in the liquid state, the donor and receiver layers are separated whereupon the imaging layer fractures in imagewise configuration providing a positive image of the original on one of the donor and receiver layers and a negative image on the other layer.

The basic physical property desired in the imaging layer is that it be frangible as prepared. That is, the layer must be sufficiently weak structurally so that the application of electrical field combined with the action of actinic radiation on the electrically photosensitive materials will fracture the imaging layer. Further, the layer must respond to the application of field the strength of which is below that field strength which will cause electrical breakdown or arcing across the imaging layer. Another term for "cohesively weak," therefore, would be "field fracturable."

As can be seen from the above, the imaging layer, in the process of this invention, is sandwiched between two layers of resinous thermally liquefiable layers. Such layers normally have a high melt viscosity such that in the liquid state the layer does not migrate from its position in the manifold set. While the resinous layers are described as being thermally liquefiable, such liquefication can occur at relatively low temperatures depending upon the type of material employed in the manifold set. For example, resinous, non-drying liquids can be employed.

In a preferred embodiment of this invention, an absorbent donor or receiver layer such as bond paper can be employed which, after completion of the imaging process, is capable of absorbing the resinous layer. In some instances it may be desirable to provide an additional barrier layer between the resinous layer and the substrate, donor or receiver layer to prevent premature absorption of the resinous layer into the substrate.

DETAILED DESCRIPTION OF THE INVENTION

As indicated above the manifold set contains a donor layer and a receiver layer. Such layers serve as the final image substrate and as will be clear from the following description of the process of this invention, each may be coated with a thermally liquefiable resinous layer while the donor is normally coated with an electrically photosensitive layer in addition to the resinous layer. In their coated condition, the donor and receiver layers may be employed in various ways to perform the process of this invention.

The donor layer and receiver layer may comprise any suitable electrically insulating or electrically conducting material. Insulating materials are preferred since they allow the use of high strength polymeric materials. Typical insulating materials include polyethylene, polypropylene, polyethylene terephthalate, cellulose acetate, polyesters, papers, plastic coated paper, such as polyethylene coated paper, vinyl chloride-vinylidene chloride copolymers and mixtures thereof. Mylar (a polyester formed by the condensation reaction between ethylene glycol and terephthalic acid available from E. I. du Pont de Nemours & Co., Inc.) is preferred because of its durability and excellent insulative properties. Not only does the use of this type of high strength polymer provide a strong substrate for the positive and negative images formed on the donor layer and receiver layer but, in addition, it provides an electrical barrier between the electrodes and the imaging layer which tends to inhibit electrical breakdown of the system while subjecting the manifold sandwich to an electrical field. The donor layer and receiver layer may each be selected from different materials. Thus, a manifold sandwich can be prepared by employing an insulating donor sheet while a conductive material is employed as a receiver sheet.

The resinous layers bounding each side of the imaging layer of this invention comprises any thermally liquefiable material having a high melt viscosity. They are also required to retain electrically insulating properties to a high degree for at least a brief period of time while under high electric fields and temperatures employed in the imaging process. The term thermoplastic is employed herein in a broad sense to indicate materials which can be affected by temperature to reduce their viscosity. Such temperatures can be over a wide range as, for example, up to the thermal degradation temperature of the other members of the manifold set. Materials having a softening point as low as 5° C. can be employed as can materials which are commonly termed as non-drying liquid resins. In addition, the resinous layers can possess a wide range of viscosities in the liquid state. For example, the process of this invention can employ resinous layers having a viscosity in the liquid state as low as a few poises or several hundred poises at the time of image formation by separation of the manifold set.

The particularly preferred resinous materials useful in the thermally liquefiable layers of this invention include such resins as low molecular weight polystyrenes such as those available commercially from the Pennsylvania Industrial Chemical Company, 120 State Street, Clairton, Pa. 15025, under the brand name Piccolastic, Series A, D, E and F. The preferred polystyrenes are those having a molecular weight in the range of from about 300 to about 400. Higher molecular weight polystyrenes are useful and are preferably plasticized to reduce their melting point, such as Piccotex–75, Piccotex–100 and Piccotex–120 available also from the Pennsylvania Industrial Chemical Co. Also useful in the resin layers of this invention are copolymers of polyvinyl aromatics, substituted polyvinyl aromatics, substituted ethylenes, substituted dienes and mixtures of such polymers and/or copolymers.

The mesomer units comprising substituted polyvinyl aromatic or substituted polyvinyl aromatic radicals are typically of the general mesomer formula:

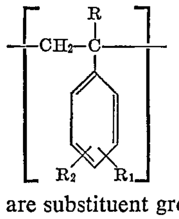

where $R_1$ and/or $R_2$ are substituent groups such as alkyls, aryls, halogens, alkoxy, cyano or alkoxy carboxyl groups and R represents a monovalent radical such as hydrogen or an alkyl group. ("Mesomer," herein, means a repeating unit of which a polymer is comprised, as defined in Golding B., "Polymers and Resins," Van Nostrand, New York, 1959, p. 2. Of course, copolymers include mesomers or radical units of other constituent radicals which are copolymerized to form the desired copolymer.) Compounds (which may be called monomers or comonomers) from which such radical units are derived and then copolymerized to form the desired copolymers include p-decyl styrene, p-vinyl biphenyl styrene, p-chloro styrene, dichloro styrene, p-methoxy styrene, p-cyano styrene, p-methoxy carboxyl styrene and others. The polyvinyl aromatic may also be a derivative of a fused ring aromatic such as derivatives of naphthalene, anthracene or phenanthrene. The substituted ethylenes and substituted dienes from which such preferred copolymers are derived include substituted or multisubstituted ethylenes and/or dienes wherein the substituent group or groups are typically selected from the group consisting of the halogens, or cyano, alkoxy, oxyalkoxyl, carboxyl ester, or halogenated alkyl groups. Compounds (which may be called monomers or comonomers) from which such desired copolymers are derived include polyvinyl chloride, polyvinyl bromide, polyvinylidene chloride, polymethacrylonitrile, polyacrylonitrile polyvinyl acetate, polyvinyl stearate, polyethyl acrylate, polyhexylmethacrylate, chloroprene, poly - 1-methoxybutadiene and others.

Such preferred softenable materials include custom synthesized styrene-substituted styrene copolymers such as styrene-p-decyl styrene; custom synthesized copolymers of styrene and styrene derivatives with other vinyl monomers, such as vinyl chloride, vinyl acetate, such as a custom synthesized p-decyl styrene-vinyl acetate copolymer; and custom synthesized copolymers of styrene and substituted styrene with acrylic and methacrylic monomers such as custom synthesized p-decyl styrene-methacrylonitrile; as well as mixtures of any of the above.

More particularly, resin copolymers which are useful comprise high molecular weight styrene-acrylate copolymers such as a custom synthesized copolymer of styrene and hexylmethacrylate, having styrene mesomers comprising between about 35 and about 85 weight percent of the copolymer and having a molecular weight greater than about 10,000. For example, such materials include an about 71/29 weight percent styrene-hexylmethacrylate copolymer (80/20 mole percent) having (1) a molecular weight of about 41,000–42,000 and an intrinsic viscosity in toluene at 25° C. of about 0.16; (2) molecular weight of about 25,000–26,000 and intrinsic viscosity in toluene at 25° C. of about 0.12; (3) molecular weight of about 57,000–58,000 and intrinsic viscosity in toluene at 25° C. of about 0.21; (4) molecular weight of about 150,000–151,000 and intrinsic viscosity in toluene at 25° C. of about 0.33. In addition, custom synthesized styrene-hexylmethacrylate copolymers of about 62/38 weight percent (about 73/27 mole percent) having a molecular weight of about 25,000 intrinsic viscostiy in toluene at 25° C. of about 0.14, and custom synthesized about 52/48 weight percent styrene-hexylmethacrylate (about 64/36 mole percent) having a molecular weight of about 40,000 and intrinsic viscosity in toluene at 25° C. of about 0.19. Other useful resin materials comprise copolymers of styrene and n-butyl-methacrylate, having styrene monomers comprising between about 15 and about 80 weight percent of the copolymer and having molecular weights greater than about 10,000. For example, such a copolymer can comprise about 37/63 weight percent copolymer of styrene/n-butylmethacrylate (about 45/55 mole percent) having a molecular weight of about 46,000 and intrinsic viscosity in toluene at 25° C. of about 0.23. Another example is an about 91/9 weight percent styrene-octylacrylate copolymer (about 95/5 mole percent) having molecular weight of about 45,000 and intrinsic viscosity in toluene of about 0.23. Other such materials include styrene-ethylacrylate copolymers, styrene-2-ethylhexylacrylate copolymers, styrene - isobutylmethacrylate copolymers, styrene - alurylmethacrylate copolymers, p-chlorostyrene-octylacrylate copolymers, 2,5-dichlorostyrene-octylacrylate copolymers and p - methoxystyrene-methacrylate copolymers. The molecular weight of polymers and copolymers expressed herein are typically expressed in terms of weight average molecular weights. Other materials have been found at least suitable for use in the present invention. These materials include silicone resins such as SR 2 and SR 84, as well as other higher molecular silicone resins all available from the General Electric Company and Dow C4, a methyl-phenyl silicone, available from Dow Chemical Co., and R5061A, a silicone resin available from Dow Corning Co.; and phenolic resins such as ET–693, a phenyl-formaldehyde resin, and Amberol ST, both available from the Dow Chemical Co. Other such materials include Amoco 18, polyalphamethyl styrene available from Amoco Chemical Corp.; PS–2 and PS–3, both available from the Dow Chemical Co., Midland, Michigan; Nyrez, a polyterpene resin available from Tenneco, and ST–5000 and a polyterpene resin available from Schnectady Chemicals.

In general, the liquefiable layer should be from about ½ to 16 microns in thickness and may be prepared by any suitable technique. Typical methods of preparation include dip coating, roll coating, draw coating or poor coating; with better control and more uniform results can be obtained with dip and roll coating techniques. Thicker layers generally requiring a greater potential for charging and, in general, thicknesses from about 1 to 5 microns have been found to yield particularly good results.

Among the desirable physical and rheological characteristics of the advantageous softenable materials of the present invention, the glass transition temperature, Tg, has been found to be a particularly useful guide in compounding new and useful copolymeric softenable materials. Materials having lower Tg will require lower image development temperatures than materials with higher Tg.

The electrically photosensitive imaging layer rests upon a resinous thermally liquefiable layer as described above and in the imaging process is sandwiched between two such resinous layers. In the coated condition, the imaging layer is structurally fracturable in response to the combined effects of an electric field and exposure to electromagnetic radiation to which it is sensitive. This structurally fracturable condition is conveniently retained by coating the top surface of the imaging layer with a second resinous thermally liquefiable layer. This second layer may be applied directly upon the electrically photosensitive layer or as is preferred by first coating the resinous thermally liquefiable layer upon a receiver layer and then contacting the coated surface of the receiver layer with the imaging layer thus completing the manifold set.

The imaging layer serves as the photoresponsive element of the system as well as the colorant for the final image produced. Other colorants such as dyes and pigments may be added to the imaging layer so as to intensify or modify the color of the final image produced when color is important. Preferably, the imaging layer is selected so as to have a high level of response while at the same time being intensely colored so that a high contrast image can be formed by the high gamma system of this invention. The imaging layer may be homogeneous comprising, for example, a solid solution of two or more pigments. The imaging layer may also be heterogeneous comprising, for example, pigment particles dispersed in a binder.

One technique for achieving low cohesive strength in the imaging layer is to employ relatively weak, low molecular weight materials therein. Thus, for example, in a single component homogeneous imaging layer, a monomeric compound or a low molecular weight polymer complexed with a Lewis acid to impart a high level of photoresponse to the layer may be employed. Similarly, when a homogeneous layer utilizing two or more components in solid solution is selected to make up the imaging layer, either one or both of the components of the solid solution may be a low molecular weight material so that the layer has the desired low level of cohesive strength. This approach may also be taken in connection with the heterogeneous imaging layer. Although the binder material in the heterogeneous system may in itself be photosensitive, it does not necessarily have this property. Materials may be selected for use as this binder material solely on the basis of physical properties without regard to their photosensitivity. This is also true of the two component homogeneous system where photoinsensitive materials with the desired physical properties can be used. Any other technique for achieving low cohesive strength in the imaging layer may also be employed. For example, suitable blends of incompatible materials such as a blend of a polysiloxane resin with a polyacrylic ester resin may be used either as the binder layer in a heterogeneous system or in conjunction with a "homogeneous" system in which the photoresponsive material may be either one of the incompatible components (complexed with a Lewis acid) or a separate and additional component of the layer. The thickness of the imaging layer whether homogeneous or heterogeneous ranges from about 0.2 micron to about 10 microns generally about 0.5 micron to about 5 microns and preferably about 2 microns.

The ratio of photosensitive pigment to binder by weight in the heterogeneous system may range from about 10 to 1 to about 1 to 10 respectively, but it has generally been found that ratios in the range of from about 1 to 4 to about 2 to 1 respectively produce the best results and, accordingly, this constitutes a preferred range.

The imaging layer contains any suitable electrically photosensitive material. Typical organic materials include: quinacridones such as: 2,9-dimethyl quinacridone, 4,11-dimethyl quinacridone, 2,10-dichloro-6,13-dihydro-quinacridone, 2,9 - dimethoxy-6,13-dihydro-quinacridone, 2,4,9,11-tetrachloro-quinacridone, and solid solutions of quinacridones and other compositions as described in U.S. Pat. 3,160,510; carboxamides such as:

N-2″-pyridyl-8,13-dioxodinaphtho-(2,1-2′,3′-)-furan-6-carboxamide,
N-2″-(1″,3″,5″-triazyl-8,13-dioxodinaphtho-(2,1-2′,3′)-furan-6-carboxamide,
anthra-(2,1)-naphtho-(2,3-d)-furan-9,14-dione-7-(2′-methyl-phenyl) carboxamide;

carboxanilides such as:

8,13-dioxodinaphtho-(2,1-2′,3′)-furan-6-carbox-p-methoxyanilide,
8,13-dioxodinaphtho-(2,1-2′,3′)-furan-6-carbox-p-methylanilide,
8,13-dioxodinaphtho-(2,1-2′,3′)-furan-6-carbox-m-chloroanilide,
8,13-dioxodinaphtho-(2,1-2′,3′)-furan-6-carbox-p-cyanoanilide;

triazines such as:

2,4-diamino-triazine,
2,4-di(1′-anthraquinonyl-amino)-6-(1″-pyrenyl)-triazine,
2,4-di(1′-anthraquinonyl-amino)-6-(1″-naphthyl)-triazine,
2,4-di (1′-naphthyl-amino)-6-(1′-perylenyl)-triazine,
2,4,6-tri (1′,1″,1‴-pyrenyl)-triazine;

benzopyrrocolines such as:

2,3-phthaloyl-7,8-benzopyrrocoline,
1-cyano-2,3-phthaloyl-7,
8-benzopyrrocoline,
1-cyano-2,3-phthaloyl-5-acetamido-7,8-benzopyrrocoline;

anthraquinones such as:

1,5-bis-(beta-phenylethyl-amino) anthraquinone,
1,5-bis-(3′-methoxypropylamino) anthraquinone,
1,5-bis (benzyamino) anthraquinone,
1,5-bis (phenyl-amino) anthraquinone,
1,2,5,6-di (c,c′-diphenyl)-thiazole-anthraquinone,
4′(2′-hydroxyphenylmethoxyamino) anthraquinone;

azo compounds such as:

2,4,6-tris (N-ethyl-N-hydroxy-ethyl-p-aminophenylazo) phloroglucinol,
1,3,5,7-tetrahydroxy-2,4,6,8-tetra (N-methyl-N-hydroxy-ethyl-p-amino-phenylazo) naphthalene,
1,3,5-trihydroxy-2,4,6-tris (3′-nitro-N-methyl-N-hydroxy-methyl-4′-animophenylazo) benzene, 3-methyl-1-phenyl-4-(3′-pyrenylazo)-2-pyrazolin-5-one,
1-(3′-pyrenylazo)-2-hydroxy-3-naphthanilide,
1-(3′-pyrenylazo)-2-naphthol,
1-(3′-pyrenylazo)-2-hydroxypyrene,
1-(3′-pyrenylazo)-2-hydroxy-3-methylxanthene,
2,4,6-tris (3′-pyrenylazo) phloroglucinol,
2,4,6-tris (1′-phenanthrenylazo) phloroglucinol,
1-(2′-methoxy-5′-nitro-phenylazo)-2-hydroxy-3′-nitro-3-naphthanilide;

salts and lakes of compounds derived from 9-phenylxanthene, such as:

phosphotogstomolybdic lake of 3,6-bis (ethylamino)-9,2′-carboxyphenyl xanthenonium chloride,
barium salt of 3,2′-toluidine amino-6-2″-methyl-4″-sulphophenyl-amino-9-2‴-carboxyphenyl xanthene;
phosphomolybdic lake of 3,6-bis (ethylamino)-2,7-dimethyl-9-2′-carbethoxy-phenylxanthenonium chloride;

dioxazines such as:

2,9-dibenzoyl-6,13-dichloro-triphenodioxazine,
2,9-diacetyl-6,13-dichloro-triphenodioxazine,
3,10-dibenzoylamino-2,9-diisopropoxy-6,13-dichloro-triphenodioxazine,
2,9-difuroyl-6,13-dichloro-tripheno-dioxazine;

lakes of fluorescein dyes, such as:

lead lake of 2,7-dinitro-4,5-dibromo fluorescein,
lead lake of 2,4,5,7-tetrabromo fluorescein,
aluminum lake of 2,4,5,7-tetrabromo-10,11,12,13-tetrachloro fluorescein;

bisazo compositions such as:

N,N′-di [1′(1′-naphthylazo)-2-hydroxy-8-naphthyl] adipdiamide,
N,N′-di-1-(1′-naphthylazo)-2-hydroxy 8-naphthyl succindiamide,
bis-4,4′-(2″-hydroxy-8″-N,N′-diterephthalamide-1-naphthylazo)biphenyl,
3,3′-methoxy-4,4′-diphenyl-bis (1″-azo-2″-hydroxy-3″-naphthanilide);

pyrenes such as:

1,3,6,8-tetraaminopyrene,
1-cyano-6-nitropyrene;

phthalocyanines such as:

beta-form metal free phthalocyanine,
copper phthalocyanine,
tetrachloro phthalocyanine,
the "X"-form of metal-free phthalocyanine as described in U.S. Pat. 3,357,989;

metal salts and lakes of azo dyes, such as:

calcium lake of 6-bromo-1 (1′-sulfo-2-naphthylazo)-2-naphthol,
barium salt of 6-cyano-1(1′-sulfo-2-naphthylazo)-2-naphthol,
calcium lake of 1-(2′-azonaphthalene-1′-sulfonic acid)-2-naphthol,
calcium lake of 1-(4′-ethyl-5′-chloroazobenzene-2′-sulfonic acid)-2-hydroxy-3-naphthoic acid;

and mixtures thereof.

Typical inorganic compositions include cadmium sulfied, cadmium sulfoselenide, zinc oxide, zinc sulfide, sulphur selenium, mercuric sulfide, lead oxide, lead sulfide, cadmium selenide, titanium dioxide, indium trioxide and the like.

In addition to the aforementioned organic materials other organic materials which may be employed in the imaging layer include polyvinylcarbazole;
2,4-bis(4,4′-diethyl-aminophenyl)-1,3,4-oxidiazole;
N-isopropylcarbazole;
polyvinylanthracene;
triphenylpyrrol;
4,5-diphenylimidazolidinone;
4,5-diphenylimidazolidinethinone;
4,5-bis-(4′-amino-phenyl)-imidazolidinone;
1,2,5,6-tetraazacyclo-octatetraene-(2,4,6,8);
3,4-di(4′-methoxyphenyl)-7,8-diphenyl-1,2,5,6-tetraazacyclooctatetraene-(2,4,6,8);
3,4-di(4′-phenoxy-phenyl)-7,8-diphenyl-1,2,5,6-tetraaza-cyclooctatetraene-(2,4,6,8);
3,4,7,8-tetramethoxy-1,2,5,6-tetraaza-cyclooctatetraene-(2,4,6,8);
2-mercapto-benzthiazole;
2-phenyl-4-alpha-naphthylidene-oxazolone;
2-phenyl-4-diphenylideneoxazolone;
2-phenyl-4-p-methoxy-benzylidene-ozazolone;
6-hydroxy-2-phenyl (p-dimethyl-amino phenyl)-benzofurane;
6-hydroxy-2,3-di(p-methoxyphenyl)-benzofurane;
2,3,5,6-tetra-(′-methoxyphenyl)-furo-(3,2F)-benzofurane;
4-dimethyl-amino-benzylidene-benzhydrazide;
4-dimethyl-aminobenzylideneiso-nicotinic acid hydrazide;
turfurylidene (2)-4′-dimethylamino-benzhydrazide;
5-benzylidene-amino-acenaphthene-3-benzylidene-amino-carbazole;
(4,N,N-dimethylamino-benzylidene)-p-N,N-dimethyl aminoaniline;
(2-nitro-benzylidene)-p-bromo-aniline;
N,N-dimethyl-N′-(2′-nitro-4-cyano-benzylidene)-p-phenylene-diamine;
2,4-diphenyl-quinazoline;
2-(4′-amino-phenyl)-4-phenyl-quinazoline;
2-phenyl-4-(4′-dimethyl-amino-phenyl)-7-methoxy-quinazoline;
1,3-diphenyl-tetrahydroimidazole;
1,3-di-(4′-chlorophenyl)-tetra-hydroimidazole;
1,3-diphenyl-2-4′-dimethylaminophenyl)-tetra-hydroimidazole;
1,3-di-(p-tolyl)-2-[quinolyl-(2′-)]-tetra-hydro-imidazole;
3-(4′-dimethylamino-phenyl)-5-(4″-methoxy-phenyl)-6-1,2,4-triazine;
3-pyridil-(4′)-5-(4′-dimethylamino-phenyl)-6-phenyl-1,2,4-triazine;
3-(4′-amino-phenyl)-5,6-di-phenyl-1,2,4-triazine;
2,5-bis[4′-amino-phenyl-(1′)]-1,3,3-triazole;
2,5-bis[4′-N-ethyl-N-(acetyl-amino)-phenyl-(1′)]-1,3,4-triazole;
1,5-diphenyl-3-methyl-pyrazoline;
1,3,4,5-tetra-phenyl-pyrazoline;
1-phenyl-3-(p-methoxy styrl)-5-(p-methoxy-phenyl)-pyrazoline;
1-methyl-2-(3′,4′-dihydroxy-methylene-phenyl)-benzimidazole;
2-(4′-dimethyl-amino phenyl)-benzoxazole;
2-(4′-methoxyphenyl)-benzthiazole;
2,5-bis[p-amino-phenyl-(1)]-1,3,4-oxidiazole;
4,5-diphenyl-imidazolone;
3-amino-carbazole;

copolymers and mixtures thereof.

Other materials include organic donor-acceptor (Lewis acid-Lewis base) charge-transfer complexes made up of aromatic donor resins such as phenolaldehyde resins, phenoxides, epoxies, polycarbonates, urethanes, styrene or the like complexed with electron acceptors such as 2,4,7-trinitro-9-fluorenone;
2,4,5,7-tetranitro-9-fluorenone;
picric acid;
1,3,5-trinitro benzene;
chloranil;
2,4-dichloro-benzoquinone;
anthraquinone-2-carboxylic acid;
4-nitro-phenyl;
maleic anhydride;

metal halides of the metals and metalloids of Groups I–B and II–VIII of the periodic table including, for example, aluminum chloride, zinc chloride, ferric chloride, magnesium chloride, calcium iodide, strontium bromide, chromic bromide, arsenic triiodide, magnesium bromide, stannous chloride etc.; boron halides, such as boron trifluorides; ketones such as benzophenone and anisil, mineral acids such as sulfuric acid; organic carboxylic acids such as acetic acid and maleic acid, succinic acid, citroconic acid, sulphonic acid, such as 4-toluene sulphonic acid and mixtures thereof. In addition to the charge transfer complexes, it is to be noted that many other of the above materials may be further sensitized by the charge transfer complexing technique and that many of these materials may be dye-sensitized to narrow, broaden or heighten their spectral response curves.

It is also to be understood that the electrically photosensitive particles themselves may consist of any suitable one or more of the aforementioned electrically photosensitive materials, either organic or inorganic, dispersed in, in solid solution in, or copolymerized with, any suitable insulating resin whether or not the resin itself is photosensitive. This particular type of particle may be particularly desirable to facilitate dispersion of the particle, to prevent undesirable reactions between the binder and the photosensitive material or between the photosensitive and the activator and for similar purposes. Typical resins of this type include polyethylene, polypropylene, polyamides, polymethacrylates, polyacrylates, polyvinyl chlorides, polyvinyl acetates, polystyrene, polysiloxanes, chlorinated rubbers, polyacrylonitrile, epoxies, phenolics, hydrocarbon resins, and other natural resins such as rosin derivatives as well as mixtures and copolymers thereof.

The x-form phthalocyaine is preferred because of its excellent photosensitivity although any suitable phthalocyanine may be used to prepare the imaging layer of this invention. The phthalocyanine used may be in any suitable crystal form. It may be substituted or unsubstituted both in the ring and straight chain portions. Reference is made to a book entitled "Phthalocyanine Compounds" by F. H. Moser and A. L. Thomas, published by the Reinhold Publishing Company, 1963 edition for a detailed description of phthalocyanines and their synthesis. Phthalocyanines encompassed within this invention may be described as compositions having four isoindole groups linked by four nitrogen atoms in such a manner so as to form a conjugated chain, said compositions have the general formula $(C_8H_4N_2)_4R_n$ wherein R is selected from the group consisting of hydrogen, deuterium, lithium, sodium, potassium, copper, silver, beryllium, magnesium, calcium, zinc, cadmium, barium, mercury, aluminum, gallium, indium, lanthanium, neodymium, samarium, europium, gadolinium, hypsprosium, holmium, erbium, thulium, ytterbium, lutecium, titanium, tin, hafnium, lead, silicon, germanium, thorium, vanadium, antimony, chromium, molybdenum, uranium, manganese, iron, cobalt, nickel, rhodium, palladium, somium and platinum; and $n$ is a value of greater than 0 and equal to or less than 2. Any other suitable phthalocyanines such as ring or aliphatically substituted metallic and/or non-metallic phthalocyanines may also be used if suitable. As above noted, any suitable phthalocyanine may be used to prepare the photoconductive layer of the present invention. Typical phthalocyanines are:

aluminum phthalocyanine,
aluminum polychlorophthalocyanine,
antimony phthalocyanine,
barium phthalocyanine,
beryllium phthalocyanine,
cadimum hexadecachlorophthalocyanine,
cadmium phthalocyanine,
calcium phthalocyanine,
cerium phthalocyanine,
chromium phthalocyanine,
cobalt phthalocyanine,
cobalt chlorophthalocyanine,
copper 4-aminophthalocyanine,
copper bromochlorophthalocyanine,
copper 4-chlorophthalocyanine,
copper 4-nitrophthalocyanine,
copper phthalocyanine,
copper phthalocyanine sulphonate,
copper polychlorophthalocyanine,
deuteriophthalocyanine,
dysprosium phthalocyanine,
erbium phthalocyanine,
europium phthalocyanine,
gadolinium phthalocyanine,
gallium phthalocyanine,
germanium phthalocyanine,
hafnium phthalocyanine,
halogen substituted phthalocyanine,
holmium phthalocyanine,
indium phthalocyanine,
iron phthalocyanine,
iron polyhalophthalocyanine,
lanthanum phthalocyanine,
lead phthalocyanine,
lead polychloro phthalocyanine,
cobalt hexaphenylphthalocyanine,
copper pentaphenyl-phthalocyanine,
lithium phthalocyanine,
lutecium phthalocyanine,
magnesium phthalocyanine,
manganese phthalocyanine,
mercury phthalocyanine,
molybdenum phthalocyanine,
naphthalocyanine,
neodymium phthalocyanine,
nickel phthalocyanine,
nickel polyhalophthalocyanine,
osmium phthalocyanine,
palladium phthalocyanium,
palladium chlorophthalocyanine,
alkoxyphthalocyanine,
alkylaminophthalocyanine,
alkylmercaptophthalocyanine,
aralkylaminophthalocyanine,
aryloxyphthalocyanine,
arylmercaptophthalocyanine,
copper phthalocyanine piperidine,
cycloalkylaminophthalocyanine,
dialkylaminophthalocyanine,
diaralkylaminophthalocyanine,
dicycloalkylaminophthalocyanine,
hexadecahydrophthalocyanine,
imidomethylphthalocyanine,
1,2-naphthalocyanine,
2,3-naphthalocyanine octaazaphthalocyanine,
sulfur phthalocyanine,
tetraazaphthalocyanine,
tetra-4-acetylaminophthalocyanine,
tetrachloromethylphthalocyanine,
tetradiazophthalocyanine,
tetra-4-dimethyloctaazaphthalocyanine,
tetra-4,5-diphenylenedioxide phthalocyanine,
tetra-4,5-diphenyloctaazaphthalocyanine,
tetra-(6′-methyl-benzothiazoyl) phthalocyanine,
tetra-p-methylphenylaminophthalocyanine,
tetramethylphthalocyanine,
tetra-naphtho-triazolylphthalocyanine,
tetra-4-naphthylphthalocyanine,
tetra-4-nitrophthalocyanine,
tetra-perinaphthylene-4,5-acta-azaphthalocyanine,
tetra-2,3-phenyleneoxide phthalocyanine,
tetra-4-phenyl-octaazaphthalocyanine,
tetraphenylphthalocyanine,
tetraphenylphthalocyanine tetracarboxylic acid,
tetraphenylphthalocyanine tetrabarium carboxylate, tetraphenylphthalocyanine tetra-cadmium carboxylate,
tetrapyridylphthalocyanine,
tetra-4-trifluoromethyl mercaptophthalocyanine,
tetra-4-trifluoromethylphthalocyanine,
4,5-trionaphthene-octaazaphthalocyanine,
platinum phthalocyanine,
potassium phthalocyanine,
rhodium phthalocyanine,
samarium phthalocyanine,
silver phthalocyanine,
silicon phthalocyanine,
sodium phthalocyanine,
sulfonated phthalocyanine,
thorium phthalocyanine,
thulium phthalocyanine,
tin chlorophthalocyanine,
tin phthalocyanine,
titanium phthalocyanine,
uranium phthalocyanine,
vanadium phthalocyanine,
ytterbium phthalocyanine,
zinc chlorophthalocyanine,
zinc phthalocyanine, others described in the Moser text and mixtures, dimers, trimmers, oligomers, polymers, copolymers or mixtures thereof.

The binder material in the heterogeneous imaging layer or the material used in conjunction with the electrically photosensitive materials in the homogeneous layer, where applicable, may comprise any suitable cohesively weak insulating material or materials which can be rendered cohesively weak. Typical materials include: microcrystalline waxes such as: Sunoco 1290, Sunoco 5825, Sunoco 985, all available from Sun Oil Co.; Paraflint RG, available from the Moore and Munger Company; paraffin waxes such as: Sunoco 5512, Sunoco 3425, available from Sun Oil Co.; Sohio Parowax, available from Standard Oil of Ohio; waxes made from hydrogenated oils such as: Capitol City 1380 wax, available from Capitol City Products, Co., Columbus, Ohio; Caster Wax L–2790, available from Baker Caster Oil Co.; Vitikote L–304, available from Duro Commodities; polyethylene such as: Eastman Epolene N–11, Eastman Epolene C–12, available from Eastman Chemical Products, Co.; Polyethylene DYJT, Polyethylene DYLT, Polyethylene DYDT, all available from Union Carbide Corp.; Marlex TR 822, Marlex 1478, available from Phillips Petroleum Co.; Epolene C–13, Epolene C–10, available from Eastman Chemical Products, Co.; Polyethylene AC8, Polyethylene AC612, Polyethylene AC324, available from Allied Chemicals; modified styrenes such as: Piccotex 75, Piccotex 100, Piccotex 120, available from Pennsylvania Industrial Chemical; vinylacetate-ethylene-copolymers such as: Elvax Resin 210, Elvax Resin 310, Elvax Resin 420, available from E. I. du Pont de Nemours & Co., Inc., Vistanex MH, Vistanex L–80, available from Enjay Chemical Co.; vinyl chloride-vinyl acetate copolymers such as: Vinylite VYLF, available from Union Carbide Corp.; styrene-vinyl toluene copolymers; polypropylenes; and mixtures thereof. The use of an insulating binder is preferred because it allows the use of a larger range of electric field strength.

A visible light source, an ultraviolet or infrared source or any other suitable source of electromagnetic radiation may be used to expose the imaging layer of this invention. The electrically photosensitive material is chosen so as to be responsive to the wavelength of the electromagnetic radiation used. It is to be noted that different electrically photosensitive materials have different spectral responses and that the spectral response of many electrically photosensitive materials may be modified by dye sensitization so as to either increase or narrow the spectral response of a material to a peak or to broaden it to make it more panchromatic in its response. In addition, more than one electrically photosensitive material can be employed simultaneously in the imaging layer.

Quite obviously, the materials employed in the manifold set (donor and receiver layers and resinous layers) are transparent to the electromagnetic radiation acting upon the imaging layer when the operative mode of the process requires the exposure of the imaging layer while it resides within the manifold set. On the other hand, transparency of materials is not always required in the manifold set of this invention inasmuch as the imaging layer can be exposed to activating electromagnetic radiation prior to being sandwiched between the other members of the manifold set.

As stated above, according to the process of this invention, the imaging layer is subjected to an electrical field. The electrical field can be applied in many ways. Generally the sandwich is placed between electrodes having different electrical potential. Also, an electrical charge can be imposed upon one or both of the donor sheet and receiver sheet before or after forming the sandwich by any one of several known methods for inducing a static electrical charge into a material. Static charges can be imposed by contacting the sheet or substrate with an electrically charged electrode. Alternatively, one or both sheets may be charged using corona discharge devices such as those described in U.S. Pats. No. 2,588,699 to Carlson, U.S. Pat. No. 2,777,957 to Walkup, U.S. Pat. No. 2,885,556 to Gundlach or by using conductive rollers as described in U.S. Pat. 2,980,834 to Tregay et al., or by frictional means as described in U.S. Pat. 2,297,691 to Carlson or other suitable apparatus.

Thus, the electrical field can be provide by means known to the art for subjecting an area to an electrical field. The electrodes employed may comprise any suitable conductive material and may be flexible or rigid. Typical conductive materials include: metals such as aluminum, brass, steel, copper, nickel, zinc, etc., metallic coatings on plastic substrates, rubber rendered conductive by the inclusion of a suitable material therein, or paper rendered conductive by the inclusion of a suitable material therein or through conditioning in a humid atmosphere to insure the presence therein of sufficient water content to render the material conductive. Conductive rubber is preferred because of its flexibility. In the process of this invention wherein the imaging layer is exposed to activating electromagnetic radiation while positioned between electrodes, one of the electrodes must be at least partially transparent. The transparent conductive electrode may be made of any suitable conductive transparent material and may be flexible or rigid. Typical conductive transparent materials include cellophane, conductively coated glass, such as tin or indium oxide coated glass, aluminum coated glass or similar coatings on plastic substrates. NESA, a tin oxide coated glass available from Pittsburgh Plate Glass Co., is preferred because it is a good conductor and is highly transparent and is readily available. In the process of this invention wherein the donor and/or receiver is composed of conductive material each may also be employed as the electrodes by which the imaging layer is subjected to an electrical field. That is either when employed as an electrode one or both of the donor sheet and receiver sheet may serve a dual function in the process of this invention.

Wherein the electric field across the imaging layer is supplied by a static charge in one of an electrically insulating donor or receiver layer, the potential of the static charge is extended across the manifold set at least at the time the set is separated. The potential is extended across the set conveniently by providing a conductive backing on each side of the manifold set and electrically interconnecting the backings.

The strength of the electrical potential applied across the manifold set depends on the structure of the manifold sandwich and the materials used. For example, if highly insulating receiver and donor substrate materials are used, a much higher potential may be applied than if relatively conductive donor and receiver sheets are used. The potential required may, however, be easily determined. If too large a potential is applied, electrical breakdown of the manifold sandwich will occur allowing arcing between the electrodes. If too little potential is applied, the imaging layer will not fracture in imagewise configuration. By way of example, if a 3 mil Mylar receiver sheet and a 2 mil Mylar donor sheet are used, potentials as high as 20,000 volts may be applied between the electrodes. The preferred potential across the manifold sandwich is, however, in the range of from about 2,000 volts per mil to about 7,000 volts per mil of electrically insulating material. Since relatively high potentials are utilized, it is desirable to insert a resistor in the circuit to limit the flow of current. Resistors on the order of from about 1 megohm to about 20,000 megohms are conventionally used.

Whether the positive image is formed on the donor sheet or the receiver sheet depends on the imaging layer materials used and the polarity of the applied field. It has been found in general, however, if the donor side electrode is held at a positive potential with respect to the receiver side electrode, that the positive image is formed on the donor sheet and a negative image is formed on the receiving sheet. That is, the illuminated portions of the imaging layer adhere to the receiver sheet and the non-illuminated areas of the imaging layer adhere to the donor sheet. It has also been found, in general, that when the imaging layer is coated onto a donor sheet, the best quality images are produced by exposing through the donor sheet. Various modifications of the image sense can be achieved by such means as reversing the polarity of the field across the imaging layer subsequent to the exposure step but prior to separating the manifold set. Other means such as grounding or reducing the potential will also result in reversal of the image sense, i.e., upon separation of the manifold set the positive and negative images will reside on layers opposite of those had the field modification not occurred. A more detailed description of methods whereby image reversal is achieved are found in copending applications Ser. Nos. 609,125 filed Jan. 13, 1967 and 81,357 filed Oct. 16, 1970.

The imaging layer can be exposed to electromagnetic radiation at any point in the process including prior to forming the manifold sandwich. Alternatively, the process of this invention can include the steps of (1) exposing the imaging layer to actinic electromagnetic radiation (2) placing the resin coated receiver on the imaging layer forming a manifold sandwich (3) subjecting the sandwich to an electrical field (4) liquefying the resinous layers and (5) separating the sandwich. For example, one embodiment of the process of this invention is the steps of (1) imposing an electrical charge on the donor as by corona discharge (2) exposing the imaging layer to electromagnetic radiation to which it is sensitive (3) forming the manifold sandwich of the donor and a resin coated receiver (4) liquefying the resin layers and (5) separating the sandwich.

In addition, the step of liquefying the resin layers can be included at any point in the process prior to the separation of the sandwich. The sequence of steps of the process of this invention including the liquefying step can be further varied by those skilled in the art without departing from the scope of this invention.

In some instances the transfer of the image produced in accordance with this invention to a different substrate may be desirable. Several preferred methods of transferring either the positive or negative image from the donor or receiver layer are known. A preferred method of transferring the manifold image is by means of pressure transfer facilitates the transfer and temperatures about equal to image development temperatures are preferred.

Images produced in accordance with the process of this invention normally retain an electrostatic charge, which charge can be employed to achieve image transfer from the donor or receiving layer. Briefly, the electrostatic transfer process involves providing a conductive backing for both the transfer sheet and the donor or receiver layer upon which the image resides. The transfer sheet is brought into contact with the image which is electrically charged, and the conductive backings are electrically interconnected. Upon separation of the transfer sheet from the donor or receiver layer, with the conductive backings connected, the image adheres to the transfer sheet. When the image material comprises photoconductive material, care is taken to prevent loss of the charge thereon by exposure to light prior to transfer.

DESCRIPTION OF THE DRAWINGS

The advantages of this improved method of imaging will become apparent upon consideration of the detailed disclosure of the invention especially when taken in conjunction with the accompanying drawing wherein:

Referring now to FIG. 1, imaging layer 2 comprising electrically photosensitive material 4 dispersed in binder material 6 is sandwiched between two thermally liquefiable resinous layers 8. Below imaging layer 2 and resinous layer 8, is donor layer 10. Above imaging layer 2 and resinous layer 8, there is provided an absorbent receiver layer 12 which is coated with a barrier layer 14 to prevent the premature absorption of resinous layer 8 during development of the image.

Figure 1:
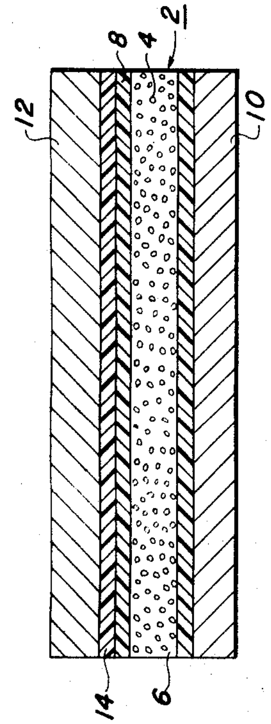
FIG. 1 is a side-sectional view of a manifold set for use in the process of this invention.

Barrier layer 14 is an insulating layer which has a melting point above that of resinous layers 8 but when melted is easily absorbed into receiver layer 12. Furthermore, barrier layer 14 may be provided on either receiver layer 12 or donor layer 10 thereby separating resinous layer 8 from both or either of the donor and receiver layers. As stated above the function of the barrier layer 14 is to prevent the absorption of resinous layer 8 into the receiver or donor layer. Thus, the barrier layer is not soluble in the resinous layer during long contact as in storage or at the liquefication temperature attained in the imaging process. However, when heated sufficiently, barrier layer 10 melts and is absorbed into the donor or receiver layer upon which it rests. Barrier layer 14 is typically from about .5 micron to about 5 microns in thickness and is preferably in the range of from 1 micron to 2 microns in thickness. The choice of materials useful in barrier layer 14 is dependent upon the type of material employed as the donor or receiver layer upon which it is coated. That is, a material is selected so as to be readily absorbed in the melt condition by the substrate upon which it is coated. Typical materials which are useful as barrier layers are microcrystalline waxes such as Sunoco 985 available from Sun Oil Company and Petrolite Bareco "Be Square" No. 1 White 190/195 available from Petrolite Corp.

Barrier layers are employed in conjunction with thermally liquefiable resinous layers which are liquid at room or ambient temperatures and are otherwise termed non-drying liquids. In the absence of a barrier layer, the non-drying liquid tends to be absorbed into the donor or receiver layer upon which it is coated, and it is thus an inefficient use of the material.

Figure 2:
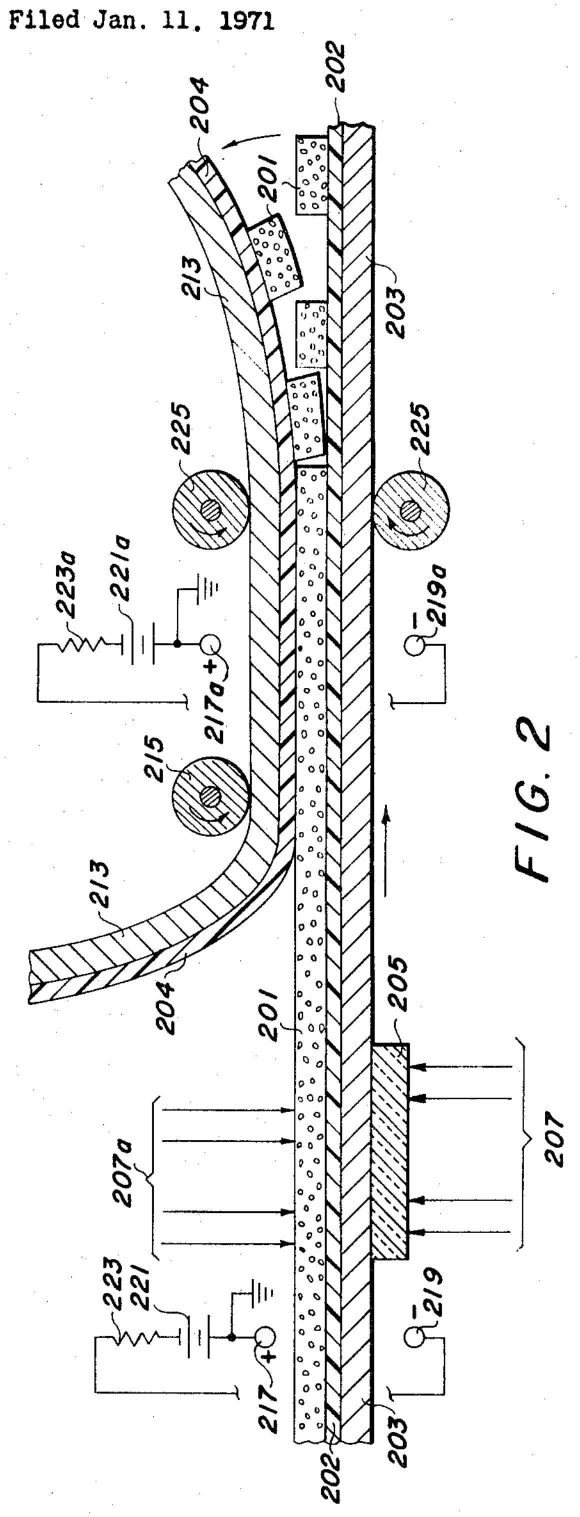
FIG. 2 is a side-sectional view diagrammatically illustrating the process steps of this invention.

Referring now to FIG. 2, there is shown a manifold imaging process capable of producing positive-to-positive copy on transparent or opaque receiver or donor layers. In FIG. 2 there is shown donor layer 203 having coated thereon successively thermally liquefiable resinous layer 202 and electrically photosensitive layer 201. There is illustrated two alternative methods of applying an electric field across the imaging layer in the process of this invention. Normally, an electric field is applied across the imaging layer by establishing a potential between electrodes 217 and 219 by means of power source 221 through resistor 223. When employing certain electrically photosensitive materials in layer 201, the electric field across the imaging layer need not be established until just prior to the separation of the donor and receiver layers as shown by electrode 217*a* and 219*a* connected to power source 221*a* and resistor 223*a*. Alternatively, the imaging layer is exposed to electromagnetic radiation 207 or 207*a* depending upon the convenience of the particular system. For example, if donor layer 203 is transparent to the electromagnetic radiation being employed, preferably the imaging layer is exposed through the donor layer 203. if donor layer 203 is opaque to the electromagnetic radiation, the imaging layer may be exposed directly as shown by electromagnetic radiation 207*a* or through an in-place transparent receiver layer 213 if desired. Also, as shown, the potential may be applied across both donor layer 203 and receiver layer 213; and, if the process of this invention is carried out employing electrodes 217 and 219, the electric field is extended across the manifold set prior to the separation of donor layer 203 and receiver layer 213.

At some point in the process prior to the separation of donor layer 203 and receiver layer 213, the manifold set is subjected to a temperature which will liquefy the thermally liquefiable layers 202 and 204. Such liquefication can occur either before, during or after the exposure step. When such layers comprise non-drying liquids, normal ambient temperatures will be adequate, however, when higher melting point layers are employed, heat is applied to the manifold set as, for example, is shown diagrammatically in FIG. 2 by heating rolls 225 which also serves as a breaking point over which the manifold set is separated. Other suitable heating means can be employed such as hot air contact, heated platen or the like. Upon separation, imaging layer 201 fractures in imagewise configuration in accordance with the electromagnetic radiation pattern to which the imaging layer is exposed. This fracture of the imaging layer will provide a positive image on one of the donor and receiver layers while a negative image resides on the other layer.

DESCRIPTION OF THE PREFERRED EMBODIMENTS

The following examples further specifically illustrate the present invention. The examples below are intended to illustrate the various preferred embodiments of the improved imaging method. The parts and percentages are by weight unless otherwise indicated.

EXAMPLE I

A donor layer is prepared by coating a two mil thick Mylar sheet with a low molecular weight polystyrene available commercially under the trade name Piccolastic A–50 from a toluene solution to provide a coating of 0.03 grams of resin per square foot on the Mylar. An electrically photosensitive imaging layer is prepared by dissolving polyethylene available under the trade name AC–612 available from Allied Chemical Company in petroleum ether (60–110° C.) and adding metal-free phthalocyanine in the "X" form, which pigment is prepared in accordance with the procedure disclosed in U.S. Pat. 3,357,989. The solution of polyethylene having dispersed therein the phthalocyanine pigment in the ratio of 2:1 respectively is quenched and exchanged with isopropyl alcohol to precipitate the polyethylene together with the phthalocyanine pigment. The precipitate is washed with isopropyl alcohol and immediately coated onto the polystyrene residing on the Mylar sheet to a coating weight of about 0.30 gram per square foot. A receiver layer is then prepared by coat- a 2 mil thick Mylar sheet with Piccolastic A–50 from a toluene solution to provide a coating of 0.14 gram per square foot on the Mylar sheet. The coated surface of the receiver and donor layer is placed together and heated to 150° F. through a pair of rollers.

The thus prepared manifold set is placed on the tin oxide surface of a NESA glass plate with the donor layer resting upon the plate. The tin oxide surface is connected to the positive terminal of a 10,000 volt DC potential and a second electrode is placed over the receiver layer connected to the negative terminal. With the potential applied, the imaging layer is exposed to an imagewise pattern of white light from an incandescent lamp through the NESA glass plate and donor layer to provide a total exposure of about .5 foot-candle seconds. The manifold sandwich is then heated to 150° F. by means of AC current through the tin oxide coating and, with the DC potential applied, the receiver layer is separated from the donor layer whereby the imaging layer fractures in imagewise configuration providing a positive image on the donor layer and a negative image of the original on the receiver layer.

EXAMPLE II

The procedure of Example I is repeated with the exception that the coated Mylar receiver layer is replaced with a sheet of bond paper having a barrier layer of wax and a resin layer over the wax layer. The barrier layer is prepared by coating the paper with a thin continuous layer of melted wax available under the trade name Sunoco 985 available from the Sun Oil Company. A layer of Piccolastic A–50 is placed over the wax layer and the thus formed receiver layer is employed in the imaging procedure of Example I. Upon removing the receiver layer from the donor layer, the receiver layer is heated to a temperature of about 190° F. whereupon the wax layer melts and is absorbed into the paper leaving the negative image well fixed to the paper.

EXAMPLE III

The procedure of Example I is repeated with the exception that the Piccolastic A–50 layer is replaced with layers of Piccolastic A–5, and the manifold set is formed and separated at a temperature of 75° F. A positive image is produced on the donor layer while a negative of the original image is provided on the receiver layer.

EXAMPLE IV

The procedure of Example I is repeated with the exception that subsequent to exposure but prior to separation of the manifold set the polarity of the potential is reversed. That is, the tin oxide coating is connected to the negative terminal of the power supply and the second electrode in contact with the receiver layer is connected to the positive terminal of the power supply. The reversed potential is applied during the separation step. A positive image is found to reside on the receiver layer while a negative image resides on the donor layer.

EXAMPLE V

The procedure of Example I is repeated with the exception that the Piccolastic A–50 is replaced with Piccolastic A–25, and the temperature to which the manifold set is heated is 130° F. at the time the manifold set is formed and separated. A positive image is provided on the donor layer and a negative image is provided on the receiver layer upon separation of the manifold set.

EXAMPLES VI–VIII

An electrically photosensitive layer is prepared by mixing 2.5 grams of Irgazine Red 2BLT available from Geigy Chemical Company with 2.5 grams of Irgazine Yellow 2GLT also available from Geigy Chemical Company, and the mixture is ball milled for 20 hours in a solution of petroleum ether (60–110° C.). The dispersion is then vacuum filtered and allowed to dry in the air. About two grams of the X form metal-free phthalocyanine is ball milled in 50 ml. of petroleum ether (60–110° C.) for 20 hours. About three grams of the Red and Yellow pigment mixture is dispersed in about 50 ml. of petroleum ether, and all three pigments are added to about 5 grams of polyethylene available under the trade name of AC–612 available from Allied Chemical Company. The mixture is heated to 80° C. with stirring and then quenched by adding about 700 ml. of room temperature isopropyl alcohol. The precipitated mixture is then vacuum filtered and flushed with 200 ml. of isopropyl alcohol, and the moist filter cake redispersed in 100 ml. of isopropyl alcohol. The dispersion is then coated by means of a No. 12 Meyer drawdown rod onto a series of two mil thick polypropylene donor layers which have previously been coated with various thermally liquefiable resin layers. On the first sheet (Example VI), a resin layer comprising polyethylene available under the trade name Piccotex-75 from the Pennsylvania Industrial Chemical Company is provided as a base for the electrically photosensitive imaging layer. On the second (Example VII), a layer of Piccolastic A–25 is provided and on the third sheet (Example VIII) a layer of Piccolastic A–50 is provided. The thus prepared donor layers containing the resin layer and the electrically photosensitive layer is then contacted with the coated side of a receiver layer prepared as in Example II. The donor and receiver layers are rolled together under heated rollers at 150° F. Each of the thus prepared manifold sets are imaged by subjecting them to an electric field and exposing them to electromagnetic radiation as described in Example I and heated to 150° F. at the time the manifold set is separated. In each instance upon separation, a positive image conforming to the original is provided in the donor and a negative image of the original is provided on the receiver sheet.

Although specific components and proportions have been stated in the above description of preferred embodiments of the invention, other typical materials as listed above, if suitable, may be used with similar results. In addition, other materials may be added to the mixture to synergize, enhance or otherwise modify the properties of the imaging layer. For example, various dyes, spectral sensitizers or electrical sensitizers such as Lewis acids may be added to the several layers.

Other modifications and ramifications of the present invention will occur to those skilled in the art upon a reading of the present disclosure. These are intended to be included within the scope of this invention.

What is claimed is:

1. An imaging member for use in the manifold imaging process having an electrically photosensitive imaging layer wherein said layer is maintained in the condition of being structurally fracturable in response to the combined effects of an applied electric field and exposure to electromagnetic radiation to which it is sensitive, comprising a donor layer, a first electrically insulating thermally liquefiable resinous layer on said donor layer, said imaging layer residing on said first resinous layer, a second electrically insulating thermally liquefiable resinous layer on said imaging layer and a receiver layer in contact with said second resinous layer whereby the structurally fracturable condition of said imaging layer is maintained by said resinous layers, said resinous layers having a melt viscosity sufficient to retain their layer configuration separate from said imaging layer.

2. An imaging member of claim 1 wherein at least one of the donor and receiver layers is transparent to electromagnetic radiation to which said imaging layer is sensitive.

3. An imaging member of claim 1 wherein the resinous layers comprise polystyrene having a molecular weight in the range of from about 300 to about 400.

4. An imaging member of claim 1 wherein the electrically photosensitive imaging layer comprises an electrically photosensitive pigment dispersed in an electrically insulating binder.

5. An imaging member of claim 1 further providing a barrier layer interpositioned between said receiver layer and said second resinous layer and said receiver layer is absorbent to said barrier layer at a temperature higher than the liquefication temperature of said second resinous layer.

6. The imaging member of claim 5 wherein the receiver layer is bond paper.

7. An imaging member of claim 1 wherein the electrically photosensitive layer comprises metal-free phthalocyanine.

8. An imaging member of claim 5 wherein the electrically photosensitive layer comprises metal-free phthalocyanine.

9. An imaging member of claim 1 wherein the imaging layer comprises a mixture of electrically photosensitive pigments.

10. An imaging member of claim 5 wherein the imaging layer comprises a mixture of electrically photosensitive pigments.

11. An imaging member of claim 1 wherein the receiver layer is electrically conductive.

12. An imaging process comprising the steps of:

(a) providing an imaging member comprising a donor layer, a first electrically insulating thermally liquefiable resinous layer on said donor layer, an electrically photosensitive imaging layer on said first resinous layer, said imaging layer being structurally fracturable in response to the combined effects of an electric field and exposure to electromagnetic radiation to which it is sensitive, a second electrically insulating thermally liquefiable resinous layer on said imaging layer and a receiver layer in contact with said second resinous layer whereby the structurally fracturable condition of said imaging layer is retained by said resinous layers, said resinous layers having a melt viscosity sufficient to retain their layer configuration separate from said imaging layer;

(b) exposing said imaging layer to electromagnetic radiation to which said layer is sensitive;

(c) subjecting said imaging layer to an electric field;

(d) thermally liquefying said resinous layers and, (e) separating said donor and receiver layers while said imaging layer is subjected to an electric field and said resinous layers are liquefied whereby said imaging layer fractures in imagewise configuration with a positive image adhering to one of said donor and receiver layers and a negative image adhering to the other of said donor and receiver layers.

13. The method of claim 12 wherein said resinous layers are thermally liquefiable at a temperature in a range of from about 75° F. to about 150° F. and said manifold set is heated to a temperature in the range of from about 75° F. to about 150° F. prior to separation of the set.

14. The method of claim 12 wherein the imaging layer comprises an organic electrically photosensitive material.

15. An imaging member of claim 1 wherein the imaging layer comprises an organic electrically photosensitive material.

16. The method of claim 12 wherein the imaging layer comprises an electrically photosensitive material dispersed in a binder.

17. The method of claim 12 wherein the imaging layer is exposed to electromagnetic radiation to which it is sensitive prior to being subjected to an electric field.

18. The method of claim 12 wherein the imaging layer is exposed to electromagnetic radiation to which it is sensitive while subjected to an electric field prior to being incorporated into a manifold set.

19. The method of claim 18 wherein the imaging layer is exposed to electromagnetic radiation on its free surface opposite the donor layer.

20. The method of claim 12 wherein at least one of the donor and receiver layers is at least partially transparent to electromagnetic radiation to which the imaging layer is sensitive and the imaging layer is exposed while subjected to an electric field and residing within the manifold set.

21. The method of claim 20 wherein the donor layer is at least partially transparent and the imaging layer is exposed through said donor layer.

22. The method of claim 20 wherein the receiver layer is at least partially transparent and said imaging layer is exposed through said receiver layer.

23. The method of claim 18 further including the step of modifying said electric field subsequent to the exposure step and prior to separation of the donor and receiver layers wherein said modification involves reversing, grounding or reducing the potential across said manifold set.

24. The method of claim 12 further including the step of transferring at least one of the positive and negative images to a different substrate.

25. The method of claim 12 wherein said transfer is performed by exerting pressure on said image and said substrate.

26. The method of claim 24 wherein said transfer is accomplished by the use of columbic attraction and an electrostatic charge on said image remaining from said electric field.

27. The method of claim 12 wherein said resinous layers comprise a polystyrene having a molecular weight in the range of from about 300 to about 400.

28. The method of claim 12 wherein said resinous layers comprise polystyrene having a molecular weight above 400 plasticized with a polystyrene having a molecular weight in the range of from about 300 to about 400.

29. The method of claim 14 wherein said imaging layer comprises metal-free phthalocyanine in an electrically insulating binder.

30. The method of claim 12 wherein said imaging layer comprises a mixture of organic electrically photosensitive material dispersed in an electrically insulating binder.

31. The method of claim 30 wherein said mixture comprises at least one cyan colored material, at least one magenta colored material and at least one yellow colored material.

32. The method of claim 12 wherein the electric field is in the range of from about 2000 volts per mil to about 7000 volts per mil.

33. The method of claim 14 wherein the electric field is in the range of from about 2000 volts per mil to about 7000 volts per mil.

34. The method of claim 12 wherein said receiver layer is electrically conductive.

35. The method of claim 12 wherein the donor layer and receiver layers are electrically insulating and the electric field across said imaging layer is supplied by a static charge in at least one of the donor and receiver layers.

36. An imaging member of claim 1 wherein at least one of said resinous layers comprises a non-drying liquid resin.

37. An imaging member of claim 36 wherein said at least one resinous layer is interpositioned between said imaging layer and said receiver sheet, and further providing a layer of electrically insulating material interpositioned between said resinous layer and said receiver sheet, said layer of insulating material preventing the absorption of said resinous layer into said receiver sheet, said receiver layer being absorbent to said layer of insulating material at a temperature higher than the liquefication temperature of said resinous layer.

38. An imaging member of claim 36 wherein said at least one resinous layer is interpositioned between said imaging layer and said donor sheet, and further providing a layer of electrically insulating material interpositioned between said resinous layer and said donor sheet, said layer of insulating material preventing the absorption of said resinous layer into said donor sheet, said donor sheet being absorbent to said layer of insulating material at a temperature higher than the liquefication temperature of said resinous layer.

References Cited

UNITED STATES PATENTS

| | | | |
|---|---|---|---|
| 3,598,581 | 8/1971 | Reinis | 96—1 X |
| 3,556,783 | 1/1971 | Kyriakakir | 96—1.5 X |
| 3,565,612 | 2/1971 | Clark | 96—1 |

RONALD H. SMITH, Primary Examiner

J. R. MILLER, Assistant Examiner

U.S. Cl. X.R.

96—1, 1.8; 117—37, 201, 215, 218